(12) United States Patent
Ekiner et al.

(10) Patent No.: US 7,393,383 B2
(45) Date of Patent: Jul. 1, 2008

(54) SEPARATION MEMBRANE MADE FROM BLENDS OF POLYIMIDE WITH POLYAMIDE OR POLYIMIDE-AMIDE POLYMERS

(75) Inventors: Okan Max Ekiner, Wilmington, DE (US); John Warren Simmons, Wilmington, DE (US)

(73) Assignee: L'Air Liquide, Societe Anonyme A Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 392 days.

(21) Appl. No.: 11/036,569

(22) Filed: Jan. 14, 2005

(65) Prior Publication Data

US 2006/0156920 A1    Jul. 20, 2006

(51) Int. Cl.
    B01D 53/22    (2006.01)
    B01D 71/64    (2006.01)
(52) U.S. Cl. .................. 95/45; 95/51; 96/10; 96/13; 96/14; 210/640; 210/500.38; 210/500.39
(58) Field of Classification Search .............. 95/45, 95/50, 51.54, 55; 96/10, 11, 12, 13, 14; 210/640, 210/500.22, 500.23, 500.27, 500.28, 500.38, 210/500.39
See application file for complete search history.

(56) References Cited

U.S. PATENT DOCUMENTS

| 3,822,202 A | * | 7/1974 | Hoehn ........................... 95/55 |
| 3,899,309 A | * | 8/1975 | Hoehn et al. .................... 95/54 |
| 4,080,744 A | | 3/1978 | Manos |
| 4,120,098 A | | 10/1978 | Manos |
| 4,532,041 A | | 7/1985 | Shuey et al. |
| 4,571,444 A | | 2/1986 | Black |
| 4,606,903 A | | 8/1986 | Hafez et al. |
| 4,705,540 A | | 11/1987 | Hayes |
| 4,717,393 A | | 1/1988 | Hayes |
| 4,836,927 A | | 6/1989 | Wan |
| 4,880,442 A | | 11/1989 | Hayes |
| 5,015,270 A | | 5/1991 | Ekiner et al. |
| 5,055,116 A | | 10/1991 | Kohn et al. |
| 5,085,676 A | | 2/1992 | Ekiner et al. |
| 5,133,867 A | | 7/1992 | La Frenier |
| 5,232,472 A | * | 8/1993 | Simmons et al. ............... 96/14 |
| 5,248,319 A | * | 9/1993 | Ekiner et al. .................... 95/54 |
| 5,266,100 A | * | 11/1993 | Simmons ........................ 95/43 |
| 5,310,415 A | * | 5/1994 | Simmons et al. ............... 95/45 |
| 5,605,627 A | | 2/1997 | Carlsen et al. |
| 5,618,332 A | * | 4/1997 | Ekiner et al. .................... 95/51 |
| 5,635,067 A | | 6/1997 | Macheras |
| 5,683,584 A | | 11/1997 | Wenthold et al. |
| 5,762,798 A | | 6/1998 | Wenthold et al. |
| 6,179,900 B1 | * | 1/2001 | Behling et al. ................. 95/45 |
| 6,180,008 B1 | | 1/2001 | White |
| 6,187,987 B1 | | 2/2001 | Chin et al. |
| 6,464,755 B2 | * | 10/2002 | Nakanishi et al. .............. 95/52 |
| 7,011,694 B1 | * | 3/2006 | Ho ................................ 95/51 |
| 7,018,445 B2 | * | 3/2006 | Simmons et al. ............... 95/51 |
| 2004/0107830 A1 | | 6/2004 | Simmons et al. |

OTHER PUBLICATIONS

Bos, et al., AIChE Journal, 47, 1088 (2001) "*Supression of Gas Separation Membrane Plasticization by Homogeneous Polymer Blending*," A.. Bos, et al., Faculty of Chemical Technology, University of Twente.
Journal of Membrane Science, 216 (2003), p. 195-205, "*Preparation and Characterization of Highly Selective Dense and Hollow Fiber Asymmetric membranes based on BTDA-TDI/MDI Co-Polyimide*," Barsema, et al.
PCT International Search Report dated Apr. 20, 2006.

* cited by examiner

*Primary Examiner*—Jason M Greene
(74) *Attorney, Agent, or Firm*—Christopher J. Cronin

(57) ABSTRACT

Membranes are used to separate fluids for the production of oxygen-enriched air, nitrogen-enriched-air, for the separation of carbon dioxide from hydrocarbons, and the separation of hydrogen from various petrochemical and oil refining streams. Membranes are discussed that provide a resistance to interaction with process components or contaminants, which can lead to plasticizing of the membrane, while providing the mechanical strength required to withstand high membrane differential pressures and high process temperatures. Membranes of blended polymers are used to improve the mechanical strength of the polymers used to make separation membranes. Specifically, polyimide polymers are combined with a blend polymer that is a polyamide and/or a polyamide-imde polymer. The resulting polymer mix is used to produce various forms of high strength, chemically resistant membranes, including hollow-fiber membranes that are suitable for high pressure, high temperature applications.

27 Claims, No Drawings

SEPARATION MEMBRANE MADE FROM BLENDS OF POLYIMIDE WITH POLYAMIDE OR POLYIMIDE-AMIDE POLYMERS

BACKGROUND

This invention relates to improved membranes for the separation of fluids from blends of specific polyimides and polyamides. Membranes fabricated from these blends exhibit a particularly useful combination of fluid-separating properties, especially for the separation of carbon dioxide from hydrocarbons and exhibit improved mechanical strength compared to the polyimide component alone.

Permselective membranes for fluid separation are known and used commercially in applications such as the production of oxygen-enriched air, production of nitrogen-enriched-air for inerting and blanketing, separation of carbon dioxide from methane, or nitrogen for the upgrading of natural gas streams, and the separation of hydrogen from various petrochemical, and oil refining streams. For certain fluid streams, one or more component or minor contaminant may exhibit a strong interaction with the material of the membrane, which can plasticize the membrane. This can result in reduced productivity and selectivity, and ultimately, loss in membrane performance. Furthermore, some membrane materials may offer resistance to the interaction with contaminants, but suffer from poor mechanical properties, resulting in membrane failure when exposed to high membrane differential pressures and high temperatures. Other materials may not be capable of processing into membranes of the desired configuration, such as a hollow fiber membrane. A membrane with a good balance of high productivity and selectivity for the fluids of interest, and persistently good separation performance, despite long-term contact with aggressive process composition, pressure and temperature conditions, and that can be processed into a wide variety of membrane configurations is highly desired.

Polymeric blending has traditionally been thought to be either problematic or of no benefit in the membrane field, primarily because different polymers are generally not miscible with one another, and for those few polymers that are miscible, offer no blending advantage because of various reasons, including difficulty in blending, poor mechanical properties, and limited range of fluid transport properties.

The references discussed below describe separation membranes known in the art and disclose information relevant to production of oxygen-enriched air, production of nitrogen-enriched-air for inerting and blanketing, separation of carbon dioxide from methane or nitrogen for the upgrading of natural gas streams, and the separation of hydrogen from various petrochemical and oil refining streams. However, these references suffer from one or more of the disadvantages discussed above.

U.S. Pat. No. 4,705,540 discloses highly permeable polyimide gas separation membranes prepared from phenylene diamines, having substituents on all positions ortho to the amine functions, and a rigid dianhydride or mixtures thereof, specifically pyromellitic dianhydride (PMDA), and 4,4'-(hexafluoroisopropylidene)-bis (phthalic anhydride) (6FDA). These polyimides form membranes with high gas permeabilities, but fairly low permselectivities. These polyimides are also sensitive to various organic solvents.

U.S. Pat. No. 4,717,393 shows that polyimides incorporating, at least, in part 3,3',4,4'-benzophenone tetracarboxylic dianhydride, and phenylene diamines, having substituents on all positions ortho to the amine functions can be photo chemically crosslinked. Membranes formed from this class of crosslinked polyimides have improved environmental stability and superior gas selectivity than the corresponding crosslinked polyimide. However, photochemical crosslinking is not truly a practical method for fabricating cost-effective gas separation membranes.

U.S. Pat. No. 4,880,442 discloses highly permeable polyimide gas separation membranes prepared from phenylene diamines, having substituents on all positions ortho to the amine functions, and essentially non-rigid dianhydrides. These polyimides again exhibit high gas permeabilities, but once again low permselectivities.

Bos, et. al., AIChE Journal, 47,1088 (2001), reports that polymer blends of Matrimid® 5218 polyimide (3,3',4,4'-benzophenone tetracarboxylic dianhydride and diaminophenylindane), and copolyimide P84 [copolyimide of 3,3',4,4'-benzophenone tetracarboxylic dianhydride, and 80% toluenediisocyanate/20% 4,4'-methylene-bis(phenylisocyanate)] can increase the stability of the membrane against carbon dioxide plasticization when compared to the plain Matrimid® 5218 membrane. Other polyimide blends or blends with polyamides or polyamide-imide for use as gas separation are not disclosed.

U. S. Pat. No. 5,055,116 describes a blend of aromatic polyimides, in which the proportion of the polymer components is adjusted to achieve certain permeability and selectivity of a polymer membrane. The final properties of a new polymer membrane may be predicted so that a membrane with those desired final properties could then be manufactured. U.S. Pat. No. 5,055,116, also indicates that the gas transport properties of the membrane prepared from the polyimide blends are predictable and the membrane may be "engineered" to achieve the desired final properties. To the contrary, the gas transport properties of the present invention are unpredictable and surprisingly good.

U.S. Pat. No. 5,635,067 discloses a fluid separation membrane based on a blend of two distinct polyimides. One is the copolymer derived from the co-condensation of benzophenone 3,3',4,4'-tetracarboxylic acid dianhydride (BTDA), and optionally pyromellitic dianhydride (PMDA) with a mixture of toluene diisocyanate, and/or 4,4'-methylene-bis(phenylisocyanate). The other is Matrimid® 5218 polyimide.

Barsema, et al., (Journal of Membrane Science, 216 (2003), p 195-205, reports the permeation performance of dense film and asymmetric hollow fiber membranes made from the copolymer derived from reacting benzophenone 3,3',4,4'-tetracarboxylic acid dianhydride (BTDA) with a mixture of toluenediisocyanate, and/or 4,4'-methylene-bis (phenylisocyanate).

U.S. Pat. Nos. 4,532,041, 4,571,444, 4,606,903, 4,836,927, 5,133,867, 6,180,008, and 6,187,987, disclose membranes based on a polyimide copolymer derived from the co-condensation of benzophenone 3,3',4,4'-tetracarboxylic acid dianhydride (BTDA), and a mixture of di(4-aminophenyl)methane, and a mixture of toluene diamines useful for liquid separations.

U.S. Pat. Nos. 5,605,627, 5,683,584, and 5,762,798, disclose asymmetric, microporous membranes based on a polyimide copolymer derived from the co-condensation of benzophenone 3,3',4,4'-tetracarboxylic acid dianhydride (BTDA), and a mixture of di (4-aminophenyl)methane, and a mixture of toluene diamines useful for liquid filtration or dialysis membranes.

Accordingly, it is highly desirable to create a membrane that can be used commercially in applications, such as the production of oxygen-enriched air, production of nitrogen-enriched-air for inerting, and blanketing, separation of carbon dioxide from methane, or nitrogen for the upgrading of natural gas streams, and the separation of hydrogen from various petrochemical and oil refining streams. The desired membranes should exhibit a resistance to interaction of the material with the process and the resulting plasticizing of the membrane. Furthermore, membranes should have superior mechanical properties to allow the use of the membranes in high differential pressure applications, and should be capable of processing into membranes of the desired configuration (such as hollow fiber membranes). Thus, membranes with a good balance of high productivity and selectivity for the fluids of interest, and persistently good separation performance despite long-term contact with aggressive process composition, pressure and temperature conditions are desired.

As used in this application, a "repeating unit" in a polymer is a molecular segment in the polymer chain backbone that repeats itself regularly along the polymer chain. In this respect, the term repeating units is meant to cover all portions of such polymers, and any number of the repeating units.

As used in this application, a "mixed polymer", is a molecularly miscible blend of at least two polymers.

SUMMARY

The membranes of the current invention can be used commercially in applications, such as the production of oxygen-enriched air, production of nitrogen-enriched-air for inerting and blanketing, separation of carbon dioxide from methane or nitrogen for the upgrading of natural gas streams, and the separation of hydrogen from various petrochemical and oil refining streams. The membranes of the invention satisfy the need to have membranes that exhibit a resistance to interaction of the material with the process and the resulting plasticizing of the membrane. Furthermore, membranes of the invention have superior mechanical properties, resulting in superior performance when exposed to high membrane differential pressures and high process temperatures. The membranes of the invention are capable of processing into membranes of a wide variety of desired configurations, such as a hollow fiber membrane. The membranes of the invention have a good balance of high productivity and selectivity for the fluids of interest, and persistently good separation performance despite long-term contact with aggressive process compositions, pressure and temperature conditions.

This invention is particularly useful for separating hydrogen from methane and/or other hydrocarbons mixtures. Such mixtures are produced as process streams in oil refineries and petrochemical plants, for example. Alternatively, this invention is useful for removing carbon dioxide and other acid gases such as hydrogen sulfide from raw natural gas to produce natural gas of pipeline quality. The membrane may comprise a composite hollow fiber membrane that comprises a supporting core layer and a fluid-separating sheath layer.

The present invention provides a membrane for fluid separation, wherein the membrane comprises a polyimide polymer, and a blend polymer that is a polyamide polymer, a polyamide-imide polymer, or mixtures of the polyamide and polyamide-imide polymer.

The polyimide polymer of the invention comprises a number of first repeating units of a formula (I).

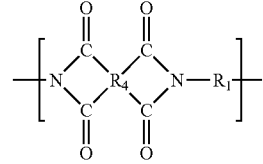

(I)

In formula (I), $R_1$ is a molecular segment of a formula (A), formula (B), formula (C), or mixtures of formula (A), formula (B), and formula (C), where formula (A), formula (B), and formula (C) are:

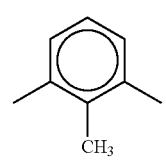

(A)

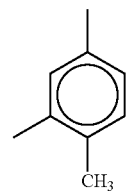

(B)

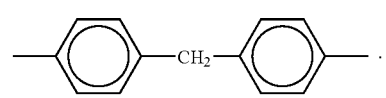

(C)

Furthermore, in formula (I), $R_4$ is a molecular segment of a formula (Q), formula (S), formula (T), or mixtures of formula (Q), formula (S), and formula (T), where formula (Q), formula (S), and formula (T) are:

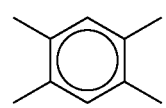

(Q)

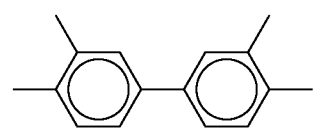

(S)

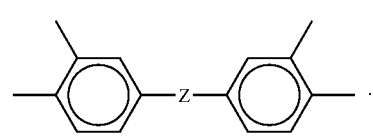

(T)

In formula (T) above, Z is a molecular segment of a formula (L), formula (M), formula (N), or mixtures of formula (L), formula (M), and/or formula (N), where formula (L), formula (M), and formula (N) are:

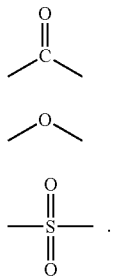

(L)

(M)

(N)

Referring to the blend polymer of the invention, the polyamide blend polymer contains a number of second repeating units of formula (II) shown below:

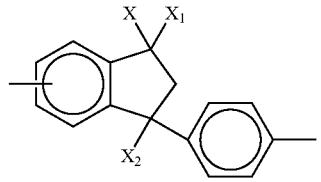

(II)

In formula (II), $R_a$ is a molecular segment of formula (a), formula (b), formula (c), formula (d), formula (e), formula (f), formula (g), or mixtures of formula (a), formula (b), formula (c), formula (d), formula (e), formula (f), and formula (g). Formula a, formula (b), formula (c), formula (d), formula (e), formula (f), and formula (g) are:

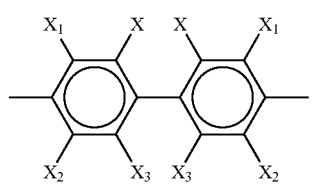

(a)

(b)

(c)

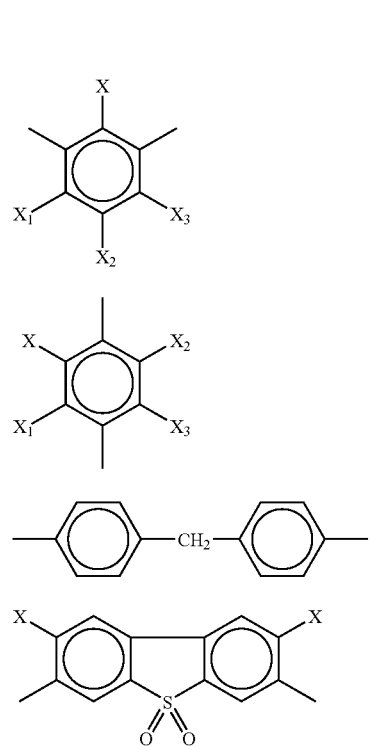

(d)

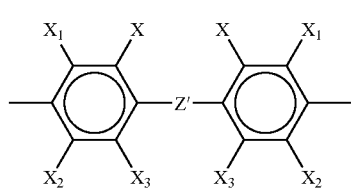

(e)

(f)

(g)

In formula (g), Z' is a molecular segment of a formula (h), formula (j), formula (k), formula (l), or mixtures of formula (h), formula (j), formula (k), and/or formula (l), where formula (h), formula (j), formula (k), and formula (l) are:

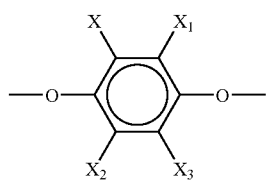

(h)

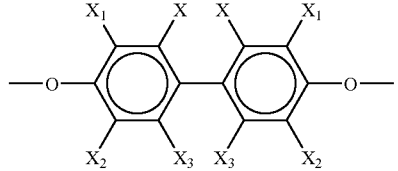

(j)

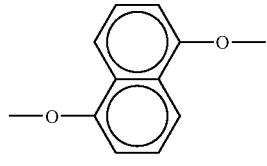

(k)

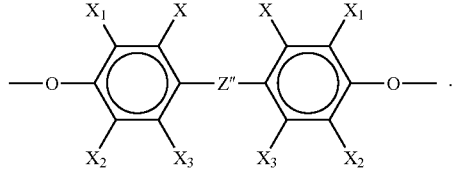

(l)

In formulas a, b, d, e, f, g, h, j, and l above, X, $X_1$, $X_2$, and $X_3$ are molecular segments of hydrogen, or an alkyl group having 1 to 6 carbon atoms. Furthermore, in formula (l), Z" is a molecular segment of a formula (m), or (p), where formula (m) and (p) are:

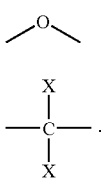
(m)

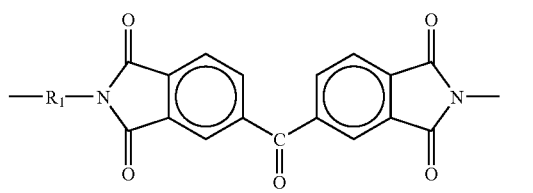
(Ia)

(p)

In formula (p), X is a molecular segment of hydrogen, or an alkyl group having 1 to 6 carbon atoms.

Again referring to formula (II), $R_2$ is a molecular segment having a formula (q), or formula (s), or mixtures of q and s, where q and s are:

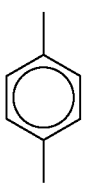
(q)

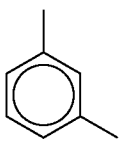
(s)

Referring again to the blend polymer of the invention, the polyamide-imide polymer contains a number of third repeating units of formula (I) described above, formula (II) described above, a formula (III), or mixtures of I, II, and/or III. Formula (III) is:

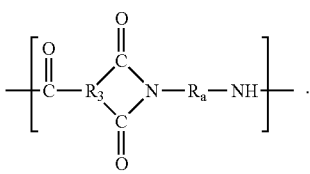
(III)

In formula (III), $R_a$ is a molecular segment of formulas a, b, c, d, e, f, g, or mixtures of a, b, c, d, e, f, and/or g. Furthermore, $R_3$ is a formula (t), shown below.

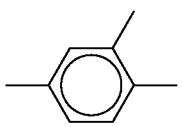
(t)

Referring to the polyimide polymer discussed above, the first repeating units may alternately be of a formula (Ia), where formula (Ia) is:

In formula (Ia), $R_1$ is a molecular segment having a composition of formula (A), formula (B), or formula (C), or a mixture of formula (A), formula (B), or formula (C) in the first repeating units and where formula (A), (B), and (C) are those described above.

In another alternate embodiment of formula (Ia), the $R_1$ in formula (Ia) has a composition of formula (A) in about 10-25% of the first repeating units, formula (B) in about 55-75% of the first repeating units, and formula (C) in about 20-40% of the first repeating units.

In another alternate embodiment of formula (Ia), the molecular segment $R_1$ has a composition of formula (A) in about 16% of the first repeating units, formula (B) in about 64% of the first repeating units, and formula (C) in about 20% of the first repeating units.

Again referring to the polyimide polymer, the first repeating units may alternately be of a formula (Ib), shown below:

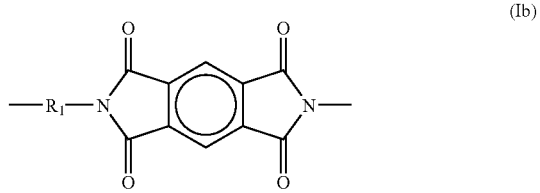
(Ib)

In formula (Ib), $R_1$ is a molecular segment having a composition of formula (A), formula (B), or mixtures of formula (A) and formula (B) in the first repeating units where formula (A), and (B) are described above.

Again, referring to the polyimide polymer, the first repeating units may alternately be of formula (Ia), and/or formula (Ib), wherein formula (Ia) and formula (Ib) are described above.

In other alternate embodiments:
  the blend polymer comprises the polyamide-imide polymer, and the ratio of the polyimide polymer to the polyamide-imide polymer is at least about 1.0;
  the blend polymer comprises the polyamide-imide polymer, and the ratio of the polyimide polymer to the polyamide-imide polymer is at least about 2.0;
  the blend polymer comprises the polyamide polymer, and the ratio of the polyimide polymer to the polyamide polymer is at least about 1.0;
  the blend polymer comprises the polyamide polymer, and the ratio of the polyimide polymer to the polyamide polymer is at least about 2.0;
  the membrane comprises between about 20-80% the polyimide polymer;
  the polyimide polymer is formed by polycondensation of an aromatic diisocyanate selected from the group consisting of 2,4-toluenediisocyanate, 2,6-toluenediisocyanate, 4,4'-methylene-bis(phenylisocyanate), and a mixture thereof, and a dianhydride selected from the group consisting of pyromellitic dianhydride, 3,3',4,4'-diphenylsulfone tetracarboxylic dianhydride, 3,3',4,4'-biphenyl tetracarboxylic dianhydride, 4,4'-(2,2,2-trifluoro-1-(trifluoromethyl)ethylidine)bis(1,2-benzene dicarboxylic acid dianhydride), and mixtures thereof;

the membrane comprises a mixed polymer of the polyimide polymer and the blend polymer, wherein the elastic modulus of the mixed polymer is greater than the elastic modulus of the polyimide polymer;

the membrane comprises a mixed polymer of the polyimide polymer and the blend polymer, wherein the elastic modulus of the mixed polymer is at least 10% greater than the elastic modulus of the polyimide polymer;

the membrane comprises a mixed polymer of the polyimide polymer and the blend polymer, wherein the yield stress of the mixed polymer is greater than the yield stress of the polyimide polymer;

the polyimide polymer, the polyamide polymer, and the polyamide-imide polymer have an average molecular weight in the range of about 20,000-400,000;

the polyimide polymer, the polyamide polymer, and the polyamide-imide polymer have an average molecular weight in the range of about 50,000-300,000;

the membrane is selected from a group consisting of an asymmetric membrane, a uniformly dense membrane, a hollow fiber membrane, and a composite membrane.

This invention also includes a method of separating one or more fluids from a fluid mixture comprising the steps of:

(a) providing a fluid separation membrane of the current invention;

(b) contacting a fluid mixture with a first side of the fluid separation membrane thereby causing a preferentially permeable fluid of the fluid mixture to permeate the fluid separation membrane faster than a less preferentially permeable fluid to form a permeate fluid mixture enriched in the preferentially permeable fluid on a second side of the fluid separation membrane and a retentate fluid mixture depleted in the preferentially permeable fluid on the first side of the fluid eparation membrane, and (c) withdrawing the permeate fluid mixture and the retentate fluid mixture separately.

DETAILED DESCRIPTION

Accordingly, the present invention provides a membrane for fluid separation comprising a blend of at least one polyimide polymer, with at least one polyamide polymer, and/or with at least one polyamide-imide polymer. Other components can be present in the blend such as, processing aids, chemical and thermal stabilizers and the like, provided that they do not significantly adversely affect the separation performance of the membrane. The membranes of the current invention exhibit an excellent combination of high permselectivity and permeability for the separation of gases. Furthermore, the membranes exhibit superior mechanical properties, which enables the membranes to withstand high membrane differential pressures and high temperatures as required of some aggressive applications.

The polyimide polymer of the invention contains the repeating units as shown in the following formula (I):

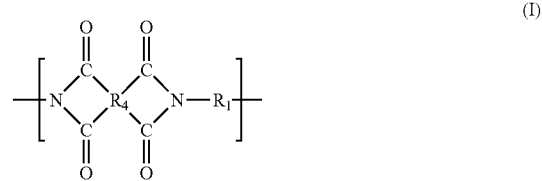

(I)

in which $R_1$ of formula (I) is a moiety having a composition selected from the group consisting of formula (A), formula (B), formula (C), and mixtures thereof, and

(A)

(B)

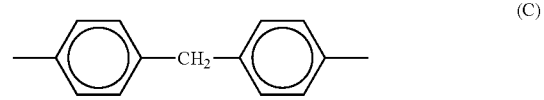

(C)

in which $R_4$ of formula (I) is a moiety having a composition selected from the group consisting of formula (Q), formula (S), formula (T) and mixtures thereof,

(Q)

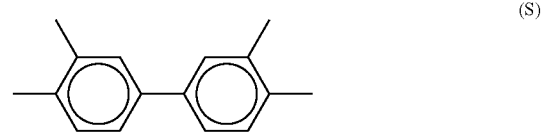

(S)

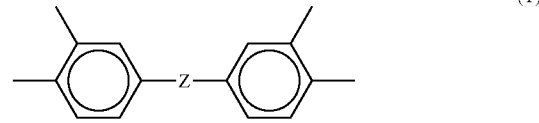

(T)

in which Z of formula (T) is a moiety selected from the group consisting of formula (L), formula (M), formula (N) and mixtures thereof.

(L)

-continued

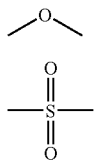
(M)
(N)

In one preferred embodiment, the polyimide component of the blend that forms the selective layer of the membrane has repeating units as shown in the following formula (Ia):

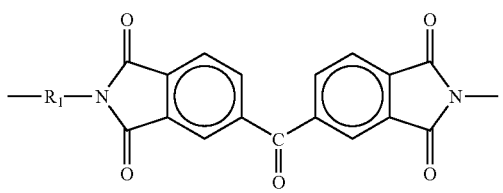
(Ia)

In this embodiment, moiety $R_1$ of formula (Ia) is of formula (A) in 0-100% of the repeating units, of formula (B) in 0-100% of the repeating units, and of formula (C) in a complementary amount totaling 100% of the repeating units. A polymer of this structure is available from HP Polymer GmbH under the trade name P84. P84 is believed to have repeating units according to formula (Ia) in which $R_1$ is formula (A) in about 16% of the repeating units, formula (B) in about 64% of the repeating units and formula (C) in about 20% of the repeating units. P84 is believed to be derived from the condensation reaction of benzophenone tetracarboxylic dianhydride (BTDA, 100 mole %), with a mixture of 2,4-toluene diisocyanate (2,4-TDI, 64 mole %), 2,6-toluene diisocyanate (2,6-TDI, 16 mole %) and 4,4'-methylene-bis (phenylisocyanate) (MDI, 20 mole %).

In another embodiment, the polyimide component of the blend that forms the selective layer comprises repeating units of formula (Ib):

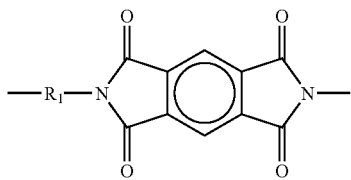
(Ib)

In one preferred embodiment, the polyimide is of formula (Ib) and $R_1$ of formula (Ib) is a composition of formula (A) in about 0-100% of the repeating units, and of formula (B) in a complementary amount totaling 100% of the repeating units.

In yet another embodiment, the polyimide is a copolymer comprising repeating units of both formula (Ia) and (Ib) in which units of formula (Ib) constitute about 1-99% of the total repeating units of formulas (Ia) and (Ib). A polymer of this structure is available from HP Polymer GmbH under the trade name P84HT. P84HT is believed to have repeating units according to formulas (Ia) and (Ib) in which the moiety $R_1$ is a composition of formula (A) in about 20% of the repeating units and of formula (B) in about 80% of the repeating units, and, in which repeating units of formula (Ib) constitute about 40% of the total of repeating units of formulas (Ia) and (Ib). P84HT is believed to be derived from the condensation reaction of benzophenone tetracarboxylic dianhydride (BTDA, 60 mole %) and pyromellitic dianhydride (PMDA, 40 mole %) with 2,4-toluene diisocyanate (2,4-TDI, 80 mole %) and 2,6-toluene diisocyanate (2,6-TDI, 20 mole %). The polyamide polymer of the blend that forms the selective layer of the membrane comprises the repeating units of the following formula (II):

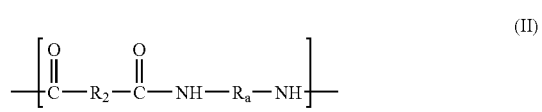
(II)

in which $R_a$ is a moiety having a composition selected from the group consisting of formulas

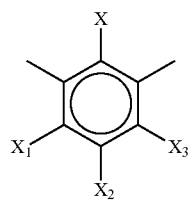
(a)

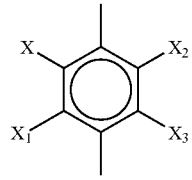
(b)

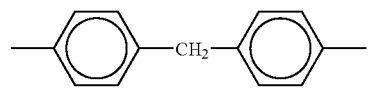
(c)

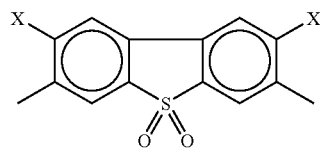
(d)

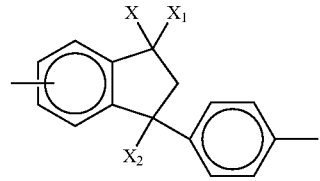
(e)

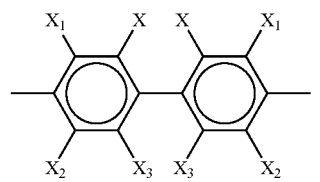
(f)

-continued

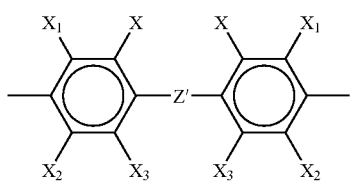
(g)

wherein in Z' of formula (g) is a moiety represented by the formula

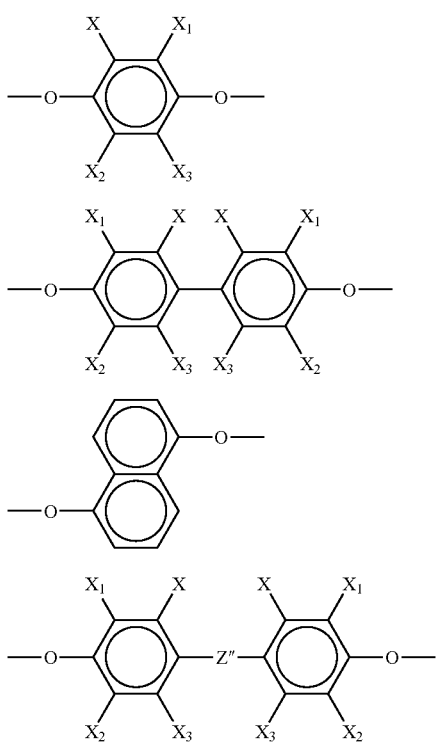
(h)
(j)
(k)
(l)

and mixtures thereof, and in which X, $X_1$, $X_2$, and $X_3$ of formulas a, b, d, e, f, g, h, j, and, l independently are hydrogen or an alkyl group having 1 to 6 carbon atoms, and Z" of formula (l) is selected from the group consisting of:

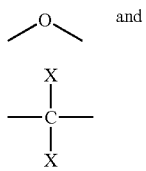
(m)
(p)

in which X of formula (p) is a moiety as described above.

$R_2$ of formula (II) is a moiety having a composition selected from the group consisting of formulas:

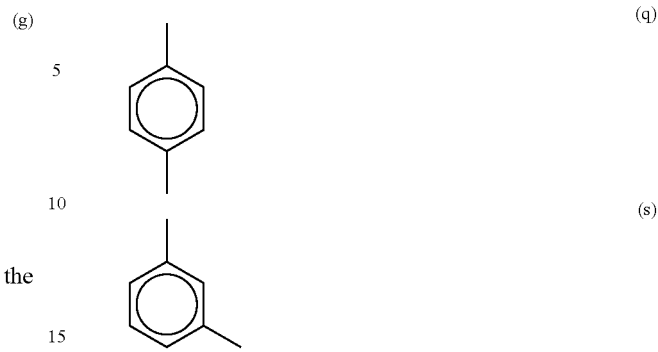
(q)
(s)

and mixtures thereof.

The polyamide-imide polymers of the blend that forms the selective layer of the membrane comprises the repeating units of formula (III); and/or a combination of the repeating units of formulas (I) and (II), (I) and (III), (II) and (III), and/or (I), (II), and (III).

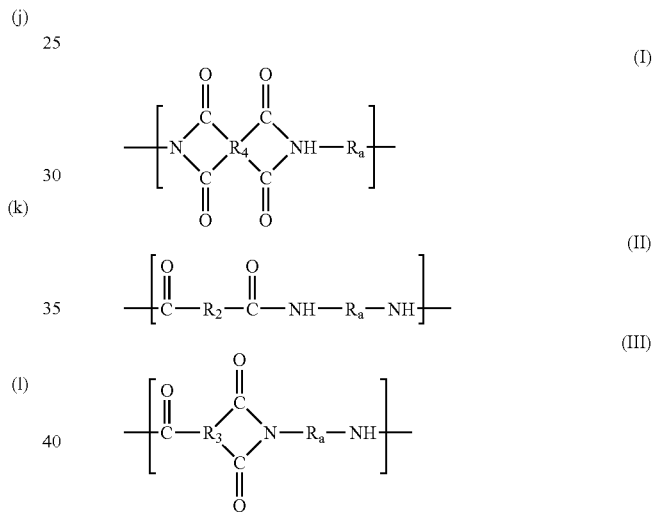
(I)
(II)
(III)

in which $R_a$, $R_2$, and $R_4$ are the same as described above, and $R_3$ is

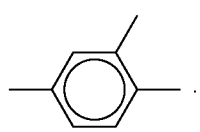
(t)

Membranes made from a blend of a polyimide or polyimides with a polyamide or polyamides, the ratio of polyimide to polyamide should preferably be at least 1:1, and more preferably, at least 2:1.

In the case of membranes made from a blend of a polyimide or polyimides with a polyamide-imide or polyamide-imides, the ratio of polyimide to polyamide-imide should preferably, be at least 1:1, and more preferably at least 2:1.

In the case of membranes made from a blend of a polyimide or polyimides with a polyamide or polyamides, and a polyamide-imide or polyamide-imides, the blend should preferably contain between 20-80% polyimide.

Surprising, the blends of this invention are homogeneous over a broad range of compositions. The miscibility of the blends of this invention may be confirmed by the presence of single compositional dependent glass transition temperature lying between those of the constituent blend components. The glass transition temperature can be measured by Differential Scanning Calorimetry or Dynamic Mechanical Analysis.

The polyimides described herein are made by methods well known in the art. The polyimides can, for example, be conveniently made by polycondensation of an appropriate diisocyanate with approximately an equimolar amount of an appropriate dianhydride. Alternatively, the polyimides can be, for example, made by polycondensation of equimolar amounts of a dianhydride and a diamine to form a polyamic acid followed by chemical or thermal dehydration to form the polyimide. The diisocyanates, diamines, and dianhydrides useful for making the polyimides of interest are usually available commercially. The polyimides are typically prepared by the latter diamine process because the diamines are more readily available than the corresponding diisocyanates.

The polyamides described herein can be made conveniently by polycondensation of an appropriate diamine or diamines with approximately an equimolar amount of an appropriate diacid chloride or mixtures of diacid chlorides by methods well known in the art.

The polyamide-imide polymers described herein can be made conveniently by polycondensation of an appropriate diamine with approximately an equimolar amount of an appropriate triacid anhydride/chloride (i.e., repeating units of formula (III)).

In the case of a mixture of polyamide/polyamide-imides, the polyamide-imides described herein can be made conveniently by:

1) polycondensation of an appropriate diamine or diamines with an equimolar amount a mixture of dianhydride and diacid chloride mixture (i.e., repeating units of formulas (I) and (II));
2) by polycondensation of an appropriate diamine or diamines with an equimolar amount of a mixture of dianhydride and triacid anhydride chloride (i.e., repeating units of formulas (I) and (III));
3) by polycondensation of an appropriate diamine or diamines with an equimolar amount of a mixture of diacid-chloride and triacid anhydride/chloride (i.e., repeating units of formulas II and III); or
4) by polycondensation of an appropriate diamine or diamines with an equimolar amount of a mixture of dianhdride, diacid chloride, and triacid anhydride/chloride (i.e., repeating units of formulas I, II, and III).

The polyimides, polyamides, and polyamide-imides should be of suitable molecular weight to be film forming and pliable so as to be capable of being formed into continuous films or membranes. The polymers of this invention preferably have a weight average molecular weight within the range of about 20,000, to about 400,000, and more preferably, about 50,000 to about 300,000.

The membranes of this invention are suitable for operating under the high pressures required for industrial separations. For example, membranes must be capable of withstanding a transmembrane pressure of 10.3 MPa-1 3.8 MPa (1500-2000 psi) in many petrochemical operations, and up to 10.3 MPa (1500 psi) in natural gas sweetening operations. Typical hollow-fiber membranes are susceptible to collapse under these conditions unless the walls of the hollow fiber are capable of withstanding the forces of high pressure. Blending of polyamides or polyamide-imides with the polyimides of this invention surprisingly increases the mechanical strength of the membranes, making them suitable for higher pressure applications.

Preferred polymers are soluble in a wide range of common organic solvents, including most amide solvents that are typically used for the formation of polymeric membranes, such as N-methyl pyrrolidone ("NMP"), N,N-dimethyl acetamide ("DMAC"), or highly polar solvents such as m-cresol.

The polymers are usually glassy and rigid, and therefore, may be used to form a single-layer membrane of an unsupported film or fiber. Such single-layer films are normally too thick to yield commercially acceptable flux of the preferentially permeable component of the feed mixture. To be economically practical, the separation membrane usually comprises a very thin selective layer that forms part of a thicker structure. This may be, for example, an integral asymmetric membrane, comprising a dense skin region that forms the selective layer and a micro-porous support region. Such membranes are described, for example, in U.S. Pat. No. 5,015,270. As a further, and preferred, alternative, the membrane may be a composite membrane, that is, a membrane having multiple layers. Composite membranes typically comprise a porous but non-selective support membrane, which provides mechanical strength, coated with a thin selective layer of another material that is primarily responsible for the separation properties. Typically, such a composite membrane is made by solution-casting (or spinning in the case of hollow fibers) the support membrane, and then solution-coating the selective layer in a separate step. Alternatively, hollow-fiber composite membranes can be made by co-extrusion spinning of both the support material and the separating layer simultaneously as described in U.S. Pat. No. 5,085,676.

The membranes of the invention can be fabricated into a wide variety of membrane forms by appropriate conventional methods known to one of ordinary skill in the art. For illustrative purposes, a method to prepare membranes in accordance with this invention is generally described as follows. A blend of polyimide and polyamide in dry particulate form is dissolved in a suitable solvent such as N-methylpyrrolidone at approximately about 20-35% polymer content. The polymer solution is cast as a sheet at the desired thickness onto a flat support layer (for flat sheet membranes), or extruded through a conventional hollow fiber spinneret (for hollow fiber membranes). If a uniformly dense membrane is desired, the solvent is slowly removed by heating or other means of evaporation. If an asymmetric membrane is desired, the film or fiber structure is quenched in a liquid that is a non-solvent for the polymer and that is miscible with the solvent for the polyimide. Alternatively, if a composite membrane is desired, the polymer is cast or extruded over a porous support of another material in either flat film or hollow fiber form. The separating layer of the composite membrane can be a dense ultra-thin or asymmetric film.

The resulting membranes may be mounted in any convenient type of housing or vessel adapted to provide a supply of the feed fluid, and removal of the permeate and residue fluids. The vessel also provides a high-pressure side or first side (for the feed fluid and residue fluid) and a low-pressure or second side of the membrane (for the permeate fluid). For example, flat-sheet membranes can be stacked in plate-and-frame modules or wound in spiral-wound modules. Hollow-fiber membranes are typically potted with a thermoset resin in cylindrical housings. The final membrane separation unit comprises one or more membrane modules, which may be housed individually in pressure vessels or multiple elements may be mounted together in a sealed housing of appropriate diameter and length.

The fluids that are produced in industrial plants such as petrochemical plants and refineries that are to be separated may vary widely in composition and character. For example, such feed fluids may include, but are not limited to, the following fluids: carbon dioxide, carbon monoxide, sulfide gases such as hydrogen sulfide, paraffins, iso-paraffins, olefins, ozone, argon, chlorine, hydrogen, methane, nitrogen, carbon monoxide, propylene, propane, hexane, and the like commonly found in gases from such sources. Of course, feed fluids from any other source and any other composition may be used as long as the membrane is not readily plasticized by any such impurities or other gases or condensates. Further, less selective and more durable membranes or other separation techniques known or used by one skilled in the art may be used to partially separate certain caustic or harmful fluids from the feed fluids prior to further separation and/or concentration by the membranes disclosed and used herein. Under a suitable driving force for permeation, such as imposing a pressure difference between the feed and permeate sides of the membrane, the more permeable component passes to the permeate side at higher rate than the less permeable component or components. For example hydrogen or carbon dioxide pass to the permeate or second side of the membrane at a higher rate than methane. This produces either a hydrogen-enriched stream or a carbon dioxide-enriched stream on the permeate side of the membrane. The hydrogen or carbon dioxide-depleted residue, occasionally referred to as the "retentate", is withdrawn from the feed side or first side.

The novel process of this invention comprises various methods of using the membranes of this invention for fluid separation and/or enrichment. For example, the invention includes a method for processing a feed mixture of two or more fluids wherein the method comprises:

(a) providing a selectively permeable membrane wherein the membrane comprises a first side and a second side, wherein the membrane comprises a blend of at least one polyimide polymer having the repeating units as shown in the formula (I), with at least one polyamide polymer having the repeating units as shown in formula (II); and/or with at least one polyamide-imide polymer having the repeating units of formula (III); and/or a combination of the repeating units of formulas (I) and (II), (I) and (III), (II) and (III), and/or (I), (II), and (III);

(b) contacting the first side of the membrane with a fluid feed mixture of at least two or more fluid components;

(c) causing at least one component of the feed mixture to selectively permeate through the membrane, thereby forming on the second side of the membrane a permeate composition which has a concentration of at least one component that is greater than the concentration of the feed mixture;

(d) removing from the second side of the membrane the permeate composition; and (e) withdrawing from the first side of the membrane a composition that has a concentration of at least one component that is less than the concentration of the feed mixture.

The novel method can operate under a wide range of conditions and is thus adapted to accept feed streams supplied from a diverse range of sources. If the feed stream is a fluid that exists already at a sufficiently high above-atmospheric pressure and a pressure gradient is maintained across the membrane, the driving force for separation can be adequate without raising feed stream pressure farther. Otherwise, the feed stream can be compressed to a higher pressure, a vacuum can be drawn on the permeate or second side of the membrane, or a combination of both can be applied to provide adequate driving force. In one preferred embodiment, the driving force for separation is a pressure gradient across the membrane of about 0.69 to about 13.8 MPa (100-2000 psi).

This invention is particularly useful for separating hydrogen from methane and/or other hydrocarbons mixtures. Such mixtures are produced as process streams in oil refineries and petrochemical plants, for example. Alternatively, this invention is useful for removing carbon dioxide and other acid gases such as hydrogen sulfide from raw natural gas to produce natural gas of pipeline quality. In this method, the membrane may comprise a composite hollow fiber membrane that comprises a supporting core layer and a fluid-separating sheath layer.

The polymer blends of the current invention are uniform and can be formed from the component polymers in conventional ways. For example, the component polymers can be synthesized separately and mixed in solution by dissolving each copolyimide in one or more suitable solvents. If the blend is solvent mixed, the solution can be stored or used directly in subsequent membrane fabrication steps or the solvent can be removed to provide a solid blend for later use. Homogeneity of the dry (i.e., solvent-free) blend either before or after membrane formation can be checked by detecting only a single compositional dependent glass transition temperature lying between the glass transition temperatures of the constituent components. Differential scanning calorimetry and dynamic mechanical analysis can be used to measure glass transition temperature.

One preferred embodiment of the blend is formed by dissolving the component polymers in separate solutions, combining the solutions and agitating the combined solutions to obtain a dissolved blend. Mild heating to temperatures in the range of about 50 to 100° C. can optionally be used to accelerate dissolution of the components. The individual components and the resulting blend are sufficiently soluble in solvents typically used for processing into suitable fluid separation membranes.

To be economically practical, the separation membrane usually comprises a very thin selective layer that forms part of a thicker structure. This may be, for example, an integral asymmetric membrane, comprising a dense skin region that forms the selective layer and a micro-porous support region. Such membranes are described, for example, in U.S. Pat. No. 5,015,270 to Ekiner. As a further alternative, the membrane may be a composite membrane, that is, a membrane having multiple layers. Composite membranes typically comprise a porous but non-selective support membrane, which provides mechanical strength, coated with a thin selective layer of another material that is primarily responsible for the separation properties. Typically, such a composite membrane is made by solution-casting (or spinning in the case of hollow fibers) the support membrane, and then solution-coating the selective layer in a separate step.

Alternatively, hollow-fiber composite membranes can be made by co-extrusion spinning of both the support material and the separating layer simultaneously as described in U.S. Pat. No. 5,085,676. The blends of the current invention are utilized in the selectively permeable layer of the membrane according to the present invention.

It is well known in the art that many chemically different polyimides are mutually incompatible and do not form homogeneous blends. Surprisingly, and contrary to conventional wisdom, the polymer blends of this invention are miscible in the compositional ranges of interest as evidenced by a single glass transition temperature of the blends, perfectly clear polymer solutions, and perfectly clear dense polymer films.

Membranes of the current invention enable an attractive combination of carbon dioxide permeability and permselectivity for carbon dioxide over methane, nitrogen, and the like. The membranes exhibit little or no plasticization by carbon dioxide or aliphatic hydrocarbons, and are thus especially useful for the removal of carbon dioxide from industrially significant fluid streams, such as in natural gas sweetening. Even at high operating pressure, membranes prepared from such polyimide blends possess an excellent balance of fluid permeation rates and selectivity of one fluid over other fluids in the multi-component fluid mixture.

EXAMPLES

This invention is now illustrated by examples of certain representative; non-limiting embodiments thereof, wherein all parts, proportions and percentages are by weight unless otherwise indicated.

Dense Film Testing

Dense film testing was utilized to determine the permeability of various samples. First, comparative samples of unblended polymers of various polyimides, polyamides, and polyamide-imides were prepared and tested. Then, test samples of blends of a polyimide with a polyamide or polyamide-imides were prepared and tested. The polyimides tested were P84 and P84HT obtained from HP Polymer GmbH.

A film was prepared by casting a 20% solution of the polymers in either NMP or m-cresol onto a glass plate at 100-120° C. using a 38×10$^{-5}$ m (15 mil) knife gap. The film was dried on the plate at this temperature for 1-2 hours, removed from the plate, cooled to room temperature and air-dried overnight. The film was further dried in a vacuum oven at about 68 kPa (20 inches Hg) at 220° C. for 3 days under a nitrogen atmosphere. A final film thickness of between 2×10$^{-5}$ and 5×10$^{-5}$ m (1-2 mils) was thus obtained.

To measure the separation performance of the polymer films a sample disk was cut from the polymer film and tested in a 47 mm ultrafiltration permeation cell (Millipore) modified for gas permeation measurement, with 2.1 MPa (300 psig) mixed-gas 20:80 $CO_2/CH_4$ feed, 6-10 mmHg permeate pressure and 35° C. temperature. The feed flowrate was set high enough to ensure very low conversion of the feed into permeate in the range of about 2-10 cm$^3$ (standard temperature and pressure "STP")/min. Sufficient time was allowed to ensure steady-state permeation. The composition of the feed and permeate streams was measured by gas chromatography with a thermal conductivity detector. The permeate composition was 85-95% $CO_2$. The flowrate through the membrane was derived from the rate of increase of the permeate pressure with a Baratron pressure sensor. The permeabilities of $CO_2$ and $CH_4$ were calculated from the flowrate measurement normalized by the partial pressure difference across the membrane and by the area and thickness of the film sample, and expressed in Barrers. A Barrer is a unit of gas permeability defined as 10$^{-10}$ cm$^3$ (STP)·cm/(sec·cm$^3$·cmHg). Selectivity was calculated as the ratio of the pure component permeabilities.

Table 1 below lists the samples of polymers and molecularly miscible blends of polymers produced. The average $CO_2$ permeability of two film samples and the average $CO_2/CH_4$ selectivity for dense film samples produced is shown in Table 1 below:

TABLE 1

| Sample # | Polyimide Polymer | Blend Polymer | Polyimide to Blend Polymer Ratio | $T_g$ (° C.) | $P_{(CO2)}$ (Ba) | $P_{(CO2)}/P_{(CH4)}$ |
|---|---|---|---|---|---|---|
| 1 | P84 | — | 1:0 | 315 | 2.3 | 47.1 |
| 2 | P84HT | — | 1:0 | 376 | 6.7 | 48.8 |
| 3 | P84 & P84HT 1:1 Blend | — | 1:0 | | | 43 |
| 4 | — | A | 0:1 | 229 | 3.2 | 30 |
| 5 | — | B | 0:1 | 244 | | |
| 6 | — | C | 0.1 | 249 | | |
| 7 | — | D | 0:1 | 247 | | |
| 8 | — | E | 0:1 | 275 | 0.5 | 64 |
| 9 | — | F | 0:1 | 267 | | |
| 10 | — | G | 0:1 | 300 | | |
| 11 | — | H | 0:1 | | 11.7 | 38 |
| 12 | — | L | 0:1 | 180 | 1.2 | 25.7 |
| 13 | P84HT | A | 1:1 | 293 | 3.2 | 40 |
| 14 | P84HT | B | 1:1 | 283 | | |
| 15 | P84 | B | 1:1 | 266 | 1.7 | 43 |
| 16 | P84 | B | 4:1 | 310 | 2 | 47 |
| 17 | P84 | C | 1:1 | | 4.7 | 31 |
| 18 | P84 | A | 1:1 | 256 | 2 | 50 |
| 19 | P84HT | C | 1:1 | 267 | 4.3 | 42 |
| 20 | P84HT | D | 1:1 | 268 | 4.6 | 40 |
| 21 | P84HT | E | 4:1 | 327 | 2.4 | 46.5 |
| 22 | P84HT | E | 3:1 | | 2.4 | 60.1 |
| 23 | P84HT | F | 1:1 | 268 | | |
| 24 | P84HT | G | 1:1 | 304 | | |
| 25 | P84 | G | 1:1 | 302 | 1.5 | 46 |
| 26 | P84 | F | 1:1 | 265 | 1.8 | 41 |
| 27 | P84 | H | 3:1 | | 3.3 | 51 |
| 28 | P84 | I | 3:1 | | 1.5 | 57 |
| 29 | P84 | J | 3:1 | | 3.7 | 44 |
| 30 | P84 | K | 3:1 | | 2.2 | 51 |
| 31 | P84 | L | 1:1 | 300 | 2.3 | 37.2 |
| 32 | P84HT | L | 1:1 | 318 | 2.4 | 38 |

For Table 1:
Permeation data measured with $CO_2(20\%)/CH_4(80\%)$ feed at 35° C. and 315 psi.
$T_g$ = Glass transition temperature
$P_{(CO2)}$ = Permeability of $CO_2$ in Barriers
$P_{(CO2)}/P_{(CH4)}$ = $CO_2/CH_4$ Selectivity
A = 2-Phenyl APB-144/IT
B = 2-Phenyl APB-144:3APS (1:1)/IT
C = 2-Phenyl APB-144:Bisaniline P (1:1)/IT
D = 2-Tertiarybutyl APB-144:2-Phenyl APB-144 (3:1)/IT
E = Metaphenylenediamine/IT
F = DAM:2-Tertiarybutyl APB-144 (1:1)/IT
G = DAM:MPD (1:1)/IT
H = TSN:DAPI (1:1)/TMAC
I = 1,6-NODA/IT
J = TMBAPB/IT
K = 2,7-NODA/IT
L = TORLON 4000T, Trimellytic anhydride acid chloride/(4,4)Oxydianiline:metaphenylenediamine) (7:3)

| The following abbreviations apply to the definitions of blend polymers in Table 1 above: | |
|---|---|
| IT = | 70:30 mixture of iso- and tere-phthaloyl chloride |
| DAM = | 2,4-diaminomesitylene |
| TSN = | 3,7-diamino-2,8-dimethyldiphenylsulfone or o-tolidine sulfone |
| MPD = | meta-phenylenediamine |
| DAPI = | diaminophenylindane; 5(6)amino-1-(4'-aminophenyl)-1,3,3'-trimethylindane |
| TMAC = | Trimellyitc anhydride acid chloride |
| 1,6 NODA = | 1,6-bis(4-aminophenoxy)naphthalene |
| TMBAPB = | 3,3',5,5'-tetramethyl-4,4'-bis(4-aminophenoxy)biphenyl |
| 2,7 NODA = | 2,7-bis(4-aminophenoxy)naphthalene |
| TORLON 4000T = | Trimellytic anhydride acid chloride/(4,4' Oxydianiline:meta-phenylenediamine) (7:3) |

The mechanical properties of dense films were also measured in extension at room temperature and compared to show the improvement in the mechanical properties of the blends. The results are reflected in Table II. The data clearly indicates that the blends of the current invention exhibit enhanced mechanical properties as evidenced by the increase in yield stress and initial elastic modulus as compared to the polyimides of P84 and P84HT.

TABLE 2

| Polyimide | Blend Polymer | Polyimide to Blend Polymer Ratio | Elastic Modulus KPa | Yield Stress KPa | Max. Strain % |
|---|---|---|---|---|---|
| P84 | — | 1:0 | 2174 | 75 | 5.9 |
| P84 | B | 4:1 | 2870 | 97 | 4.9 |
| P84 | C | 1:1 | 2843 | 90 | 5.1 |
| P84 | H | 3:1 | 2760 | 57 | 5.1 |
| P84 | I | 3:1 | 2423 | 86 | 5.6 |
| P84HT | — | 1:0 | na | Na | na |
| P84HT | C | 1:1 | 2560 | 83 | 4.5 |
| P84HT | E | 1:1 | 2967 | 81 | 4.6 |

For Table 2:
Permeation data measured with $CO_2$(20%)/$CH_4$(80%) feed at 35° C. and 2.17 KPa.
Blend Polymers B, C, E, H, and I are the same as defined for Table I.
KPa = KiloPascals pressure.

The intrinsic mechanical properties of unblended P84HT dense films could not be measured for comparison because of brittleness. The dried dense film has a tendency to crack and fall apart on the glass film casting plate. However, P84HT/Polymer E blends can be readily cast and tested for intrinsic mechanical properties in extension.

Hollow Fiber Examples and Mechanical Properties

Example 1

P84 & Polymer B (4:1)

A spin dope formulation containing 30% by weight of a polymer blend with a 4:1 ratio (by weight) of P84 and Polymer B (2-Phenyl APB-144: 3APS(1:1)/IT), 9% by weight tetramethylenesulfone, and 1.5% by weight acetic anhydride in N-methyl 2 pyrrolidone (NMP) was prepared and extruded at a rate of 180 $cm^3$/hr through a spinneret with fiber channel dimensions of outer diameter 559 microns and inner diameter equal to 254 microns at 90° C. A solution containing 85% weight NMP in water was injected to the bore of the fiber at a rate of 33 $cm^3$/hr. The nascent fiber traveled through an air gap length of 1.5 cm at room temperature into a water coagulant bath at 7° C. and wound up at a rate of 70 meters/min. The water-wet fiber was rinsed with running water at 50° C. for about 12 hrs and then sequentially exchanged with methanol and hexane as taught in U.S. Pat. Nos. 4,080,744, and 4,120,098, followed by drying at 100° C. in a vacuum oven for one hour.

The fibers were tested for He/$N_2$ separation while applying 100 psi pressure in the shell side of the fibers at 23° C. The results are reported below:
  He Permeance=116 GPU
  He/$N_2$ Selectivity=7
  A GPU is a Gas Permeation Unit $$1 GPU = 1 \times 10^{-6} cm^3(STP)/(cm^2 \, s \, cmHg)$$

The fibers were treated to seal defects in the dense separating layer by contacting the outer surfaces of the fibers with a 2% weight solution of Sylgard 184 (Dow Corning Corp) in iso-octane. The exposure time of the fibers to the post-treatment was 30 min. The fibers were dried in a vacuum oven at 100° C. The treated fibers were tested as above and the results are reported below:
  He Permeance=89 GPU
  He/$N_2$ Selectivity=144

The same treated fibers were tested for single gas $CO_2$/$CH_4$ separation at 23° C. while applying 50 psi pressure in the shell side of the fibers and results are reported below:
  $CO_2$ Permeance=19 GPU
  $CO_2$/$CH_4$ Selectivity=40

Example 2

P84 & Polymer B (4:1)

The same formulations and the spinning conditions as described in Example 1 were employed except the fiber wind up rate was maintained at 52 meters/min. The fibers were processed by the procedures described in Example 1 and tested. The results are reported below:
  Untreated fibers separation of He/$N_2$:
  He Permeance=119 GPU
  He/$N_2$ Selectivity=9
  Treated fibers separation of He/$N_2$ Separation:
  He Permeance=85 GPU
  He/$N_2$ Selectivity=149
  Treated fibers separation of $CO_2$/$CH_4$ Separation:
  $CO_2$ Permeance=17 GPU
  $CO_2$/$CH_4$ Selectivity=34

Example 3

P84HT & Polymer E (3:1)

A spin dope formulation containing 32% by weight of a polymer blend with a 3:1 ratio (by weight) of P84HT and Polymer E (Metaphenylenediamine/IT) in N-methyl 2 pyrrolidone (NMP) was prepared and extruded at a rate of 180 $cm^3$/hr through a spinneret with fiber channel dimensions of outer diameter 559 microns and inner diameter equal to 254 microns at 90° C. A solution containing 80% weight dimethylacetamide (DMAC) in water was injected to the bore of the fiber at a rate of 33 $cm^3$/hr. The nascent fiber traveled through an air gap length of 5 cm at room temperature into a water coagulant bath at 21° C. and wound up at a rate of 55 meters/min. The fibers were washed and dehydrated as discussed in Example 1 and tested for He/$N_2$ separation at 100psi and the results are reported below:
  He Permeance=155 GPU
  He/$N_2$ Selectivity=32

As described in Example 1 the fibers were post treated with 2% Sylgard 184 solution in isooctane and retested to obtain the following results:
  He Permeance=118 GPU
  He/$N_2$ Selectivity=313

The mechanical properties of the blend fibers were measured in extension at room temperature and the following results were obtained:
  E=772 MPa (112 KSI)
  $T_y$=24 MPa (3.5 KSI)
  $S_m$=62%

Pure P84HT fibers cannot be spun because of brittleness due to the low molecular weight of P84HT, which has an inherent viscosity of about 0.4 dL/gm as compared to P84 of 0.5 dL/gm and about 1.0 dL/gm for polymer E.

Example 4

P84HT & Polymer E (3:1)

The same formulations and the spinning conditions as described in Example 3 were employed except the fiber wind up rate was maintained at 75 meters/min. The fibers were processed by the procedures described in Example 1 and tested. The results are reported below:

Untreated fiber separation of $He/N_2$:
He Permeance=185 GPU
$He/N_2$ Selectivity=32
Treated fiber separation of $He/N_2$:
He Permeance=132 GPU
$He/N_2$ Selectivity=344
Treated fiber separation of $CO_2/CH_4$ at 200psi:
$CO_2$ Permeance=9 GPU
$CO_2/CH_4$ Selectivity=60

The same fibers were tested for mixed gas $CO_2(10\%)/CH_4$ (90%) at 50° C. and 800psi and the following results were obtained:

$CO_2$ Permeance=14 GPU
$CO_2/CH_4$ Selectivity=34

Due to the extensional orientations, the mechanical properties of these more drawn down fibers were found to be enhanced as reported below.

E=932 MPa (135 KSI)
$T_y$=28 MPa (4.1 KSI)
$S_m$=67%

Example 5

P-84HT-325 & Polymer B (3:1)

A spin dope formulation containing 32% weight of a polymer blend with a ratio of 3:1 (by weight) P84 and Polymer B ((2-Phenyl APB-144: 3APS(1:1)/IT) in N-methyl 2 pyrrolidone (NMP) was prepared and extruded at a rate of 180 cm³/hr through a spinneret with fiber channel dimensions of outer diameter 559 microns and inner diameter equal to 254 microns at 68° C. A solution containing 75% weight NMP in water was injected to the bore of the fiber at a rate of 38 cm³/hr. The nascent fiber traveled through an air gap length of 2.5 cm at room temperature into a water coagulant bath at 19° C. and wound up at a rate of 55 meters/min. The fibers were processed by the procedures described in Example 1 and tested for pure gas $He/N_2$ separation while applying 100 psi pressure in the shell side of the fibers at 23° C. The results are reported below:

He Permeance=721 GPU
$He/N_2$ Selectivity=6
Treated fiber separation of $He/N_2$
He Permeance=313 GPU
$He/N_2$ Selectivity=174

The same fibers were tested for mixed gas $CO_2(20\%)/CH_4$ (80%) at 50° C. and 200psi and the following results were obtained:

$CO_2$ Permeance=86 GPU
$CO_2/CH_4$ Selectivity=30

The fibers were also tested for single gas $CO_2/CH_4$ at 20° C. and 100 psi and the following results were obtained:

$CO_2$ Permeance=62 GPU
$CO_2/CH_4$ Selectivity=46

The mechanical properties of these fibers were measured and are reported below:

E=1346MPa (195 KSI)
$T_y$=39 MPa (5.6 KSI)
$S_m$=48%

Hollow Fiber/Dense Film Permeance Comparison

A hollow fiber made from a blend of P84 and P84HT was prepared by producing a spin dope formulation containing 32% P84/P84HT polymer blend (1:1 wt ratio), 9.6% tetramethylenesulfone (TMS), and 1.6% acetic anhydride in NMP. The dope was extruded at 85° C. at flowrate of 180 cm³/hour through a spinneret with fiber channel dimensions of outer diameter 559 microns and inner diameter 254 microns. A solution containing 85% NMP in water was injected at a rate of 33 cm³/hour through the spinneret to form the bore of the fiber. The nascent fiber traveled through an air gap length of 2.5 cm at room temperature into a water coagulant bath at 8° C. and was wound up at a rate of 50 m/min. The water-wet fiber was rinsed with running water at 50° C. for about 12 hours and then sequentially exchanged with methanol and hexane as taught in U.S. Pat. Nos. 4,080,744, and 4,120,098. Then the fiber was dried at 100° C. in a vacuum oven for one hour.

The untreated fibers were tested for permeation of pure $CO_2$ and $CH_4$ gases separately in a hollow fiber gas separation module. The procedure was similar to that for the dense films, above except that the feed gas on the shell side was maintained at 0.35 MPa (50 psig) at 23° C. The $CO_2$ permeance was 110 gas permeation units (GPU) and the $CO_2/CH_4$ selectivity was 25.

The fibers were treated to seal defects in the dense separating layer by contacting the outer surfaces of the fibers for 30 min. with a 2% weight solution of Sylgard® 184 (Dow Corning Corp) in isooctane. The fibers were dried in a vacuum oven at 100° C. The treated fibers were tested as above and found to have $CO_2$ permeance of 36 GPU and $CO_2/CH_4$ selectivity of 55. These same treated fibers were also tested with a 10:90 ratio mixture of $CO_2$ and $CH_4$ feed at 35° C. and 2.1 MPa (300 psig). Separation performance was $CO_2$ permeance of 14 GPU and $CO_2/CH_4$ selectivity of 45.

The selectivity of the fibers made from the P84/P84HT polymer blend agrees well with the selectivity of 43 of the P84/P84HT dense film as reported in Sample 3 of Table 1 above.

Although the present invention has been described in considerable detail with reference to certain preferred versions and examples thereof, other versions are possible. Therefore, the spirit and scope of the appended claims should not be limited to the description of the preferred versions contained herein.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A membrane for fluid separation comprising:
   a) a polyimide polymer, and
   b) a blend polymer selected from the group consisting of a polyamide polymer, a polyamide-imide polymer, and mixtures thereof,
wherein said polyimide polymer comprises a plurality of first repeating units of a formula (I), wherein said formula (I) is:

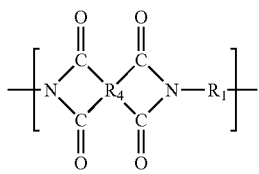
(I)

in which $R_1$ or said formula (I) is a moiety having a composition selected from the group consisting of a formula (A), a formula (B), a formula (C), and mixtures thereof, wherein said formula (A), said formula (B), and said formula (C) are:

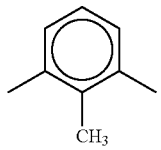
(A)

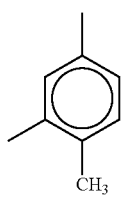
(B)

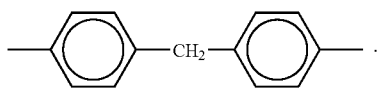
(C)

in which $R_4$ of said formula (I) is a moiety having a composition selected from the group consisting of a formula (Q), a formula (S), a formula (T), and mixtures thereof, wherein said formula (Q), said formula (S), and said formula (T) are:

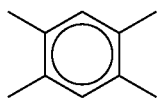
(Q)

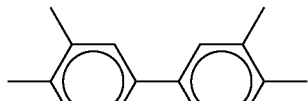
(S)

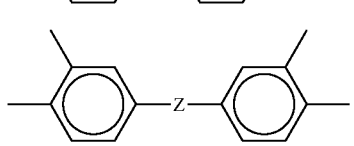
(T)

in which Z of said formula (T) is a moiety having a composition selected from the group consisting of a formula (L), a formula (M), a formula (N), and mixtures thereof, wherein said formula (L), said formula (M), and said formula (N) are:

(L)

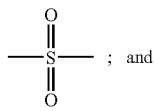
(M)

(N)

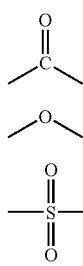
; and wherein said polyamide polymer comprises a plurality of second repeating units of a formula (II), wherein said formula (II) is:

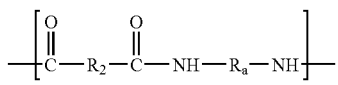
(II)

in which $R_a$ of said formula (II) is a moiety having a composition selected from the group consisting of a formula (a), a formula (b), a formula (c), a formula (d), a formula (e), a formula (f), a formula (g), and mixtures thereof, wherein said formula (a), said formula (b), said formula (c), said formula (d), said formula (e), said formula (f), and said formula (g) are:

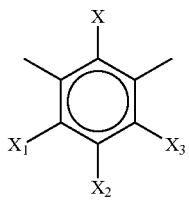
(a)

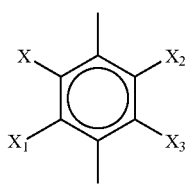
(b)

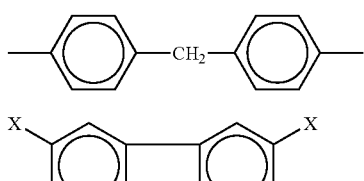
(c)

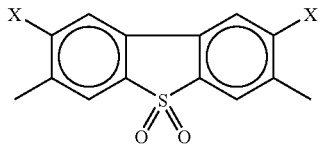
(d)

-continued

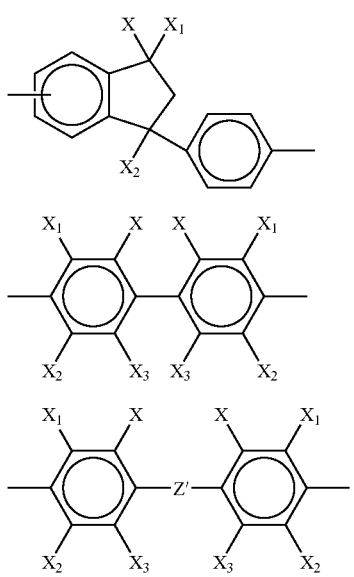

(e)

(f)

(g)

in which Z' of said formula (g) is a moiety having a composition selected from the group consisting of a formula (h), a formula (j), a formula (k), a formula (l), and mixtures thereof, wherein said formula (h), said formula (j), said formula (k), and said formula (l) are:

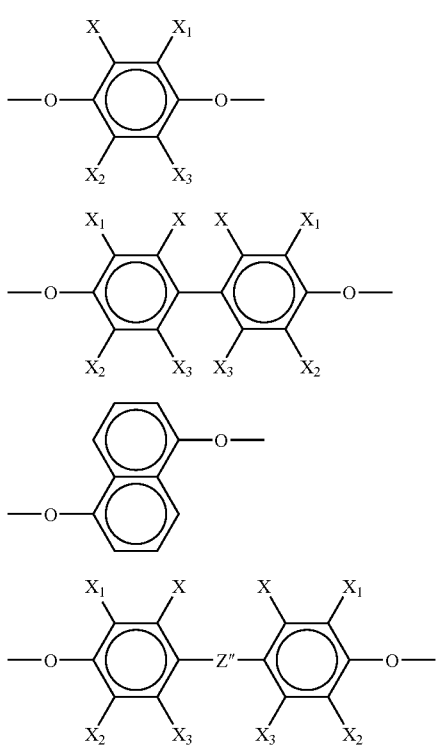

(h)

(j)

(k)

(l)

in which X, $X_1$, $X_2$, and $X_3$ of said formulas (a), (b), (d), (f), (g), (h), (j), and (l) are moieties selected independently from a group consisting of hydrogen, and an alkyl group having 1 to 6 carbon atoms, and in which Z" of formula (l) is selected from a group consisting of a formula (m), and a formula (p), wherein said formula (m) and said formula (p) are:

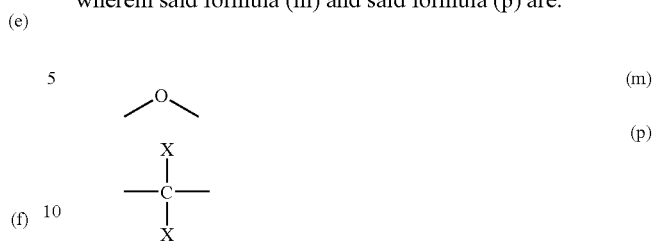

(m)

(p)

in which X of formula (p) is a moiety selected from a group consisting of hydrogen, and an alkyl group having 1 to 6 carbon atoms, and in which $R_2$ of formula (II) is a moiety selected from a group consisting having a formula (q), a formula (s), and mixtures thereof, wherein said formula (q) and said formula (s) are:

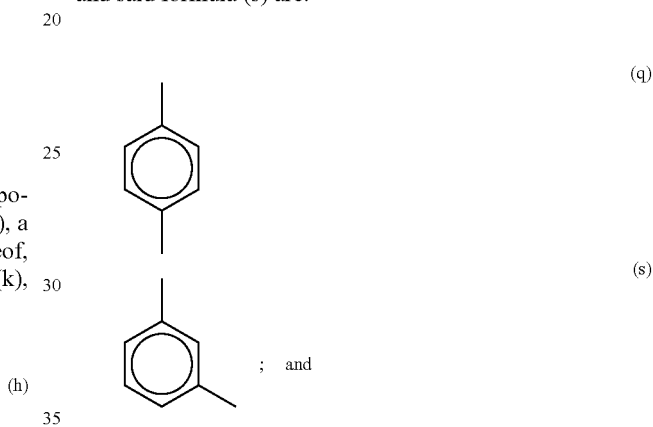

(q)

(s)

; and wherein said polyamide-imide polymer comprises a plurality of third repeating units, wherein said third repeating units are moieties selected from the group consisting of said formula (I), said formula (II), a formula (III), or mixtures thereof, wherein said formula (III) is:

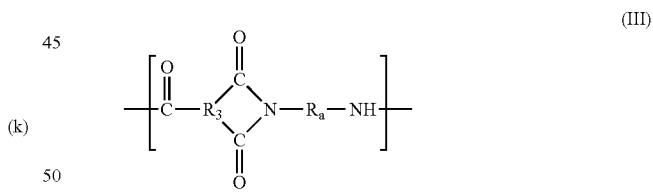

(III)

in which $R_a$ of formula (III) is a moiety having a composition selected from the group consisting of said formula (a), said formula (b), said formula (c), said formula (d), said formula (e), said formula (f), said formula (g), and mixtures thereof, and $R_3$ of said formula (III) is a formula (t), wherein said formula (t) is:

(t)

2. The membrane of claim 1, wherein said first repeating units comprise moieties of a formula (Ia), wherein said formula (Ia) is:

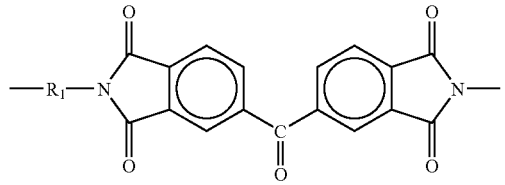

(Ia)

wherein $R_1$ of formula (Ia) is a moiety selected from the group consisting of said formula (A), said formula (B), said formula (C), and mixtures thereof.

3. The membrane of claim 2, wherein said moiety $R_1$ has a composition of:
   a) said formula (A) in about 10-25% of said first repeating units,
   b) said formula (B) in about 55-75% of said first repeating units, and
   c) said formula (C) in about 2040% of said first repeating units.

4. The membrane of claim 3, wherein said moiety $R_1$ has a composition of:
   a) said formula (A) in about 16% of said first repeating units,
   b) said formula (B) in about 64% of said first repeating units, and
   c) said formula (C) in about 20% of said first repeating units.

5. The membrane of claim 1, wherein said first repeating units comprise moieties of a formula (Ib), wherein formula (Ib) is:

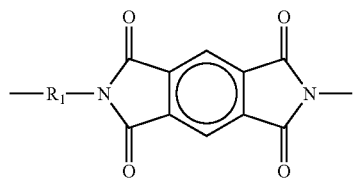

(Ib)

wherein said $R_1$ of formula (Ib) is a moiety selected from the group consisting of said formula (A), said formula (B), and mixtures thereof.

6. The membrane of claim 1, wherein said first repeating units comprise moieties of:
   a) a formula (Ia), and
   b) a formula (Ib),
wherein said formula (Ia) and said formula (Ib) are:

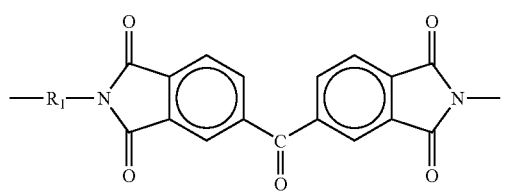

(Ia)

-continued

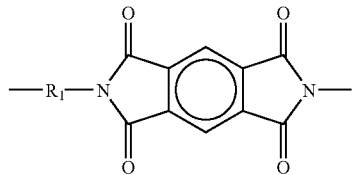

(Ib)

and wherein said first repeating units of formula (Ib) constitute about 1-99% of a total of said first repeating units, and wherein $R_1$ is a moiety having a composition of:
   a) said formula (A) in about 1-99% of said first repeating units, and
   b) said formula (B) in said first repeating units wherein $R_1$ is not of said formula (A).

7. The membrane of claim 6, wherein $R_1$ is a moiety having a composition of:
   a) said formula (A) in about 10-30% of said first repeating units, and
   b) said formula (B) in about 70-90% of said first repeating units, and wherein said first repeating units of said formula (Ib) are about 30-50% of the total of said first repeating units.

8. The membrane of claim 7, wherein RI is a moiety having a composition of:
   a) said formula (A) in about 20% of said first repeating units, and
   b) said formula (B) in about 80% of said first repeating units,
and wherein said first repeating units of said formula (Ib) are about 40% of the total of said first repeating units.

9. The membrane of claim 1, wherein said blend polymer comprises said polyamide-imide polymer, and wherein said ratio of said polyimide polymer to said polyamide-imide polymer is at least about 1.0.

10. The membrane of claim 9, wherein said ratio of said polyimide polymer to said polyamide-imide polymer is at least about 2.0.

11. The membrane of claim 1, wherein said blend polymer comprises said polyamide polymer, and wherein said ratio of said polyimide polymer to said polyamide polymer is at least about 1.0.

12. The membrane of claim 11, wherein said ratio of said polyimide polymer to said polyamide polymer is at least about 2.0.

13. The membrane of claim 1, wherein said membrane comprises between about 20-80% said polyimide polymer.

14. The membrane of claim 1, wherein said polyimide polymer is formed by polycondensation of an aromatic diisocyanate selected from the group consisting of 2,4-toluenediisocyanate, 2,6-toluenediisocyanate, 4,4'-methylene-bis (phenylisocyanate) and a dianhydride selected from the group consisting of pyromellitic dianhydride, benzophenonetetracarboxylic dianhydride, 3,3',4,4'-diphenylsulfone tetracarboxylic dianhydride, 3,3',4,4'-biphenyl tetracarboxylic dianhydride, and mixtures thereof.

15. The membrane of claim 1, comprising a mixed polymer of said polyimide polymer and said blend polymer, wherein the elastic modulus of said mixed polymer is greater than the elastic modulus of said polyimide polymer.

16. The membrane of claim 1, comprising a mixed polymer of said polyimide polymer and said blend polymer, wherein the elastic modulus of said mixed polymer is at least 10% greater than the elastic modulus of said polyimide polymer.

17. The membrane of claim 1, comprising a mixed polymer of said polyimide polymer and said blend polymer, wherein the yield stress of said mixed polymer is greater than the yield stress of said polyimide polymer.

18. The membrane of claim 1, wherein said polyimide polymer, said polyamide polymer, and said polyamide-imide polymer have an average molecular weight in the range of about 20,000-400,000.

19. The membrane of claim 18, wherein said range is about 50,000-300,000.

20. The membrane of claim 1, wherein said membrane is selected from a group consisting of an asymmetric membrane, a uniformly dense membrane, a hollow fiber membrane, and a composite membrane.

21. A method of separating one or more fluids from a fluid mixture comprising the steps of:
   (a) providing a fluid separation membrane, said membrane comprising:
      1) a polyimide polymer, and
      2) a blend polymer selected from the group consisting of a polyamide polymer, a polyamide-imide polymer, and mixtures thereof, wherein said polyimide polymer comprises a plurality of first repeating units of a formula (I), wherein said formula (I) is:

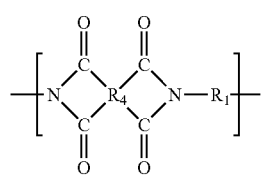

(I)

in which $R_1$ or said formula (I) is a moiety having a composition selected from the group consisting of a formula (A), a formula (B), a formula (C), and mixtures thereof, wherein said formula (A), said formula (B), and said formula (C) are:

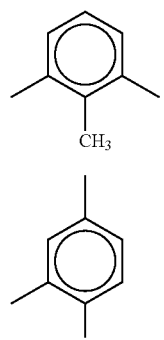

(A)

(B)

(C)

in which $R_4$ of said formula (I) is a moiety having a composition selected from the group consisting of a formula (Q), a formula (S), a formula (T), and mixtures thereof, wherein said formula (Q), said formula (S), and said formula (T) are:

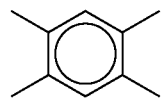

(Q)

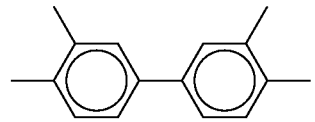

(S)

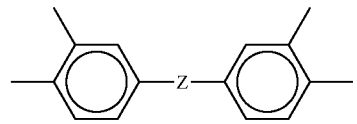

(T)

in which Z of said formula (T) is a moiety having a composition selected from the group consisting of a formula (L), a formula (M), a formula (N), and mixtures thereof, wherein said formula (L), said formula (M), and said formula (N) are:

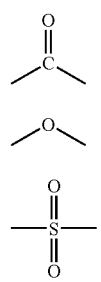

(L)

(M)

(N)

and wherein said polyamide polymer comprises a plurality of second repeating units of a formula (II),

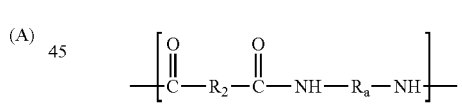

(II)

in which $R_a$ of said formula (II) is a moiety having a composition selected from the group consisting of a formula (a), a formula (b), a formula (c), a formula (d), a formula (e), a formula (f), a formula (g), and mixtures thereof, wherein said formula (a), said formula (b), said formula (c), said formula (d), said formula (e), said formula (f), and said formula (g) are:

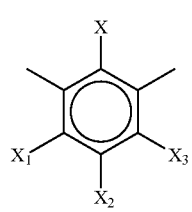

(a)

-continued

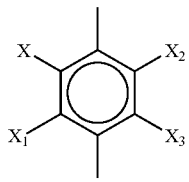
(b)

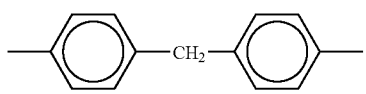
(c)

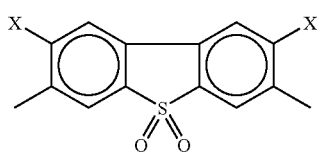
(d)

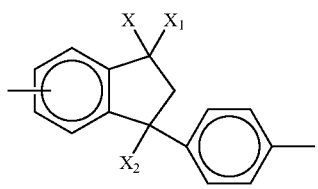
(e)

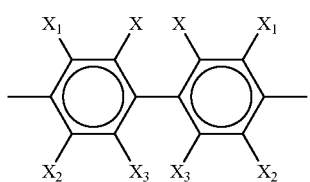
(f)

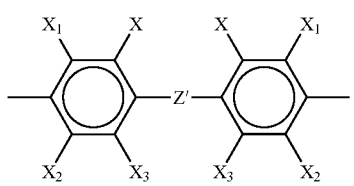
(g)

in which Z' of said formula (g) is a moiety having a composition selected from the group consisting of a formula (h), a formula (j), a formula (k), a formula (I), and mixtures thereof, wherein said formula (h), said formula (j), said formula (k), and said formula (I):

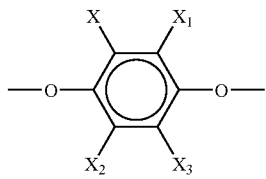
(h)

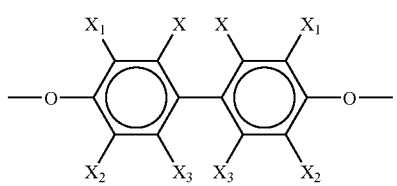
(j)

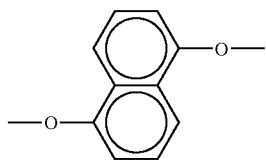
(k)

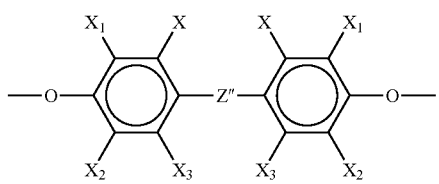
(l)

in which X, $X_1$, $X_2$, and $X_3$ of said formulas (a), (b), (d), (f), (g), (h), (j), and (I) are moieties selected independently from a group consisting of hydrogen, and an alkyl group having 1 to 6 carbon atoms, and in which Z" of formula (I) is selected from a group consisting of a formula (m), and a formula (p), wherein said formula (m) and said formula (p) are:

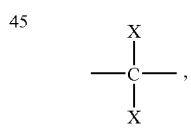
(m)

(p)

in which X of formula (p) is a moiety selected from a group consisting of hydrogen, and an alkyl group having 1 to 6 carbon atoms, and in which $R_2$ of formula (II) is a moiety selected from a group consisting having a formula (q), a formula (s), and mixtures thereof, wherein said formula (q) and said formula (s) are:

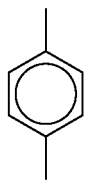
(q)

-continued

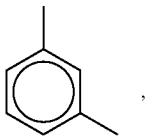

(s)

and wherein said polyamide-imide polymer comprises a plurality of third repeating units selected from the group of formulas consisting of said formula (I), said formula (II), a formula (III), or mixtures thereof, wherein said formula (III) is:

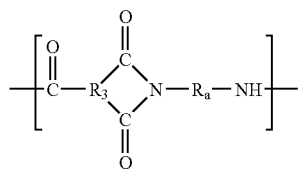

(III)

in which $R_a$ of formula (III) is a moiety having a composition selected from the group consisting of said formula (a), said formula (b), said formula (c), said formula (d), said formula (e), said formula (f, said formula (g), and mixtures thereof, and $R_3$ of said formula (III) is a formula (t), wherein said formula (t) is:

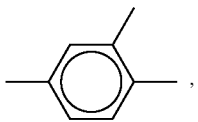

(t)

(b) contacting a fluid mixture with a first side of said fluid separation membrane thereby causing a preferentially permeable fluid of said fluid mixture to permeate said fluid separation membrane faster than a less preferentially permeable fluid to form a permeate fluid mixture enriched in said preferentially permeable fluid on a second side of said fluid separation membrane and a retentate fluid mixture depleted in said preferentially permeable fluid on said first side of said fluid separation membrane, and (c) withdrawing said permeate fluid mixture and said retentate fluid mixture separately.

22. The method of claim 21, wherein said polyimide polymer is selected from a group consisting of P84, P84HT, or mixtures thereof.

23. The method of claim 21, wherein said fluid mixture comprises carbon dioxide and methane.

24. The method of claim 21, wherein a pressure gradient across said membrane is in the range of about 100 to about 2000 psi.

25. The method of claim 24, wherein said pressure gradient is in the range of about 1000 to about 2000 psi.

26. The method of claim 21, wherein said fluid separation membrane comprises a mixed polymer of said polyimide polymer and said blend polymer, wherein the elastic modulus of said mixed polymer is greater than the elastic modulus of said polyimide polymer.

27. The membrane of claim 21, wherein said fluid separation membrane comprises a mixed polymer of said polyimide polymer and said blend polymer, wherein the yield stress of said mixed polymer is greater than the yield stress of said polyimide polymer.

* * * * *

UNITED STATES PATENT AND TRADEMARK OFFICE
CERTIFICATE OF CORRECTION

| | | |
|---|---|---|
| PATENT NO. | : 7,393,383 B2 | Page 1 of 1 |
| APPLICATION NO. | : 11/036569 | |
| DATED | : July 1, 2008 | |
| INVENTOR(S) | : Okan M. Ekiner et al. | |

It is certified that error appears in the above-identified patent and that said Letters Patent is hereby corrected as shown below:

In Column 29, line 25, replace "2040%" with --20-40%--.

In Column 35, line 28, replace "(f," with --(f),--.

Signed and Sealed this

Twentieth Day of April, 2010

David J. Kappos
*Director of the United States Patent and Trademark Office*